A. LIPPMANN.
SAFETY CONTROL FOR ELECTRICALLY OPERATED MACHINES.
APPLICATION FILED JUNE 6, 1916.

1,235,907.

Patented Aug. 7, 1917.

Inventor
Armin Lippmann
By his Attorney
Paul M. Klein

UNITED STATES PATENT OFFICE.

ARMIN LIPPMANN, OF HOBOKEN, NEW JERSEY.

SAFETY CONTROL FOR ELECTRICALLY-OPERATED MACHINES.

1,235,907. Specification of Letters Patent. Patented Aug. 7, 1917.

Application filed June 6, 1916. Serial No. 101,958.

*To all whom it may concern:*

Be it known that I, ARMIN LIPPMANN, a citizen of the United States, residing at Hoboken, in the county of Hudson and State of New Jersey, have invented new and useful Improvements in Safety Controls for Electrically-Operated Machines, of which the following is a specification.

In electrically driven machines having internal parts requiring occasional inspection, adjustment, cleaning or renewal of contents necessitating manual labor and entrance of the hands and arms of an operator into dangerous proximity with parts, which, should the machine move unexpectedly, would crush, mangle and maim the operator, it is clearly evident that extreme precautions, as to the control of the starting box or operating switch, should be observed in order to prevent such untoward occurrences.

To provide means whereby safety is assured in such mechanisms is the first object of this invention; the second object is to arrange the safety control means so as to be automatically operable, the electric circuit being positively interrupted whenever, and during the period of time, the machine is positioned, and in condition, to admit of interior manipulations, and finally, to provide such safety control devices in forms readily applicable to existing machines as well as to original installations.

With these and other objects in view, which will become more fully apparent as the disclosure progresses, an embodiment of the invention is shown and described as an attachment incorporated with a common type of beating, kneading or mixing machine as illustrative only, for, it is to be understood that adaptations may be made for widely varying mechanisms without departing from the principle involved, as set forth in the following specification, and shown in the annexed drawing, in which:—

Figure 1:
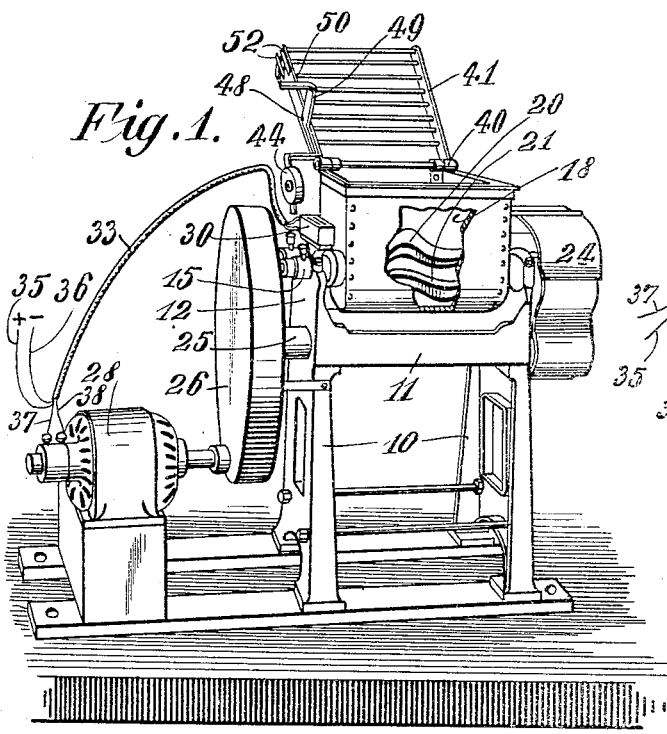
Figure 1 is a perspective view of a mixing machine showing an application of the invention.
Figure 2:
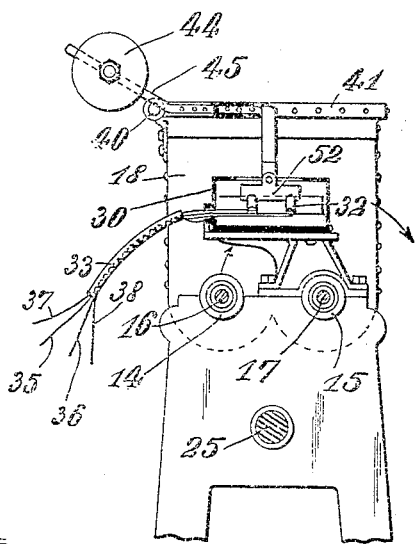
Fig. 2 is a side elevation of the same, parts being removed and the cover in operative position.
Figure 3:
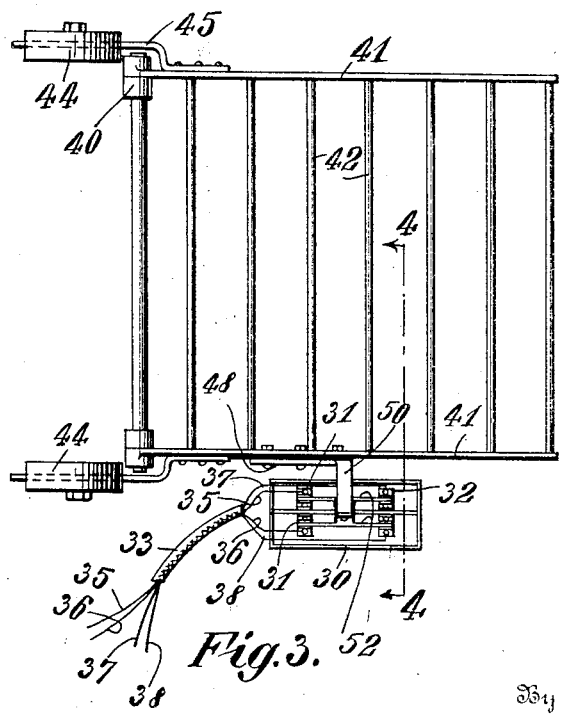
Fig. 3 is an enlarged plan view of the control elements.
Figure 4:
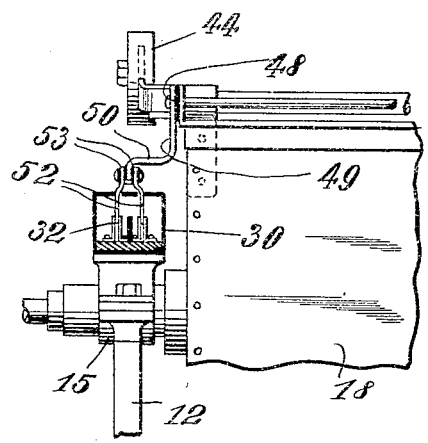
Fig. 4 is a fragmental sectional view taken on line 4—4 of Fig. 3.

The mixing machine, selected as illustrative, stands upon legs 10 secured to a floor or like foundation and consists of a body 11, having raised ends 12, in which bearings 14 and 15 are formed for the shafts 16 and 17, passing through the machine and on which the tank 18 is mounted in such manner that it may be swung forward on the bearing 15, the bearing 14 moving in a curved path of which the axis 17 is the center; this allows the tank to be readily inspected, emptied and cleaned.

Within the tank 18 are beater blades 20 and 21 secured to, or formed with, the shafts 16 and 17, the shafts being geared so as to cause the blades to turn in opposite directions, interengaging with each other and moving closely against the inner surface of the tank to thoroughly mix its contents.

The engaging and driving gears are contained in the gear box 24 at the end of the machine and are actuated through the shaft 25, driven by reducing gears, covered by the casing 26, and actuated direct by the electric motor 28, as will be clearly apparent by inspection of Fig. 1.

Thus far the mechanism is of well known type; the improvements consist of a starting box 30 rigidly attached to one end of the machine, preferably above the shaft bearings, the box being comprised of a casing, partially open at the top and containing the pole elements 31 and 32 of a double knife switch, the knives or engaging elements being omitted.

A cable 33 extends between the motor 28 and starting box 30, the same containing four insulated wires 35 and 36, leading from any source of electric power to the terminals 31, the other pair of wires 37 and 38 connecting the motor with the terminals 32, both terminals being obviously insulated.

Secured by hinges 40, to the rear edge of the open tank 18, are the arms 41 of a frame, carrying rods 42 constituting a grid cover adapted to be disposed over the tank, when in an operative position, the cover preventing the entrance of hands or other objects when closed. Counterbalancing weights 44 are adjustably disposed on levers 45, secured to the arms 41, for an obvious purpose.

Attached to one of the arms 41 is a bracket 48 having a down-turned projection 49, out-turned at the end 50, and carrying a pair of blades or plates 52 adapted to register with the terminals 31 and 32 when the tank 18 is in an upright, operative position. Thus the blades 52, which are provided with insulators 53, can form a connection between the terminals only when the cover is closed, through the top of the box 30, the machine at that time being in operable position and at no other time as the blades are moved forward, out of register with the box 30, when the tank is turned from its normal vertical position.

From the foregoing it will be evident that a safety control device entirely dependent upon the position, first of the tank, and secondly, of the cover, is provided eliminating danger to the operator and rendering it impossible to start the machine unless it is in position to operate and the safety grid cover closed over it.

It will also be apparent that modifications may be applied to other types of machines by the exercise of mechanical skill.

Having thus described my invention and set forth the manner of its construction, application and use, what I claim as new and desire to secure by Letters Patent, is:—

In a safety control for electrically driven machines, a source of electric energy, an electric motor, a pair of insulated terminals in circuit with said source of electric energy, another pair of insulated terminals in circuit with said motor, a cover hingedly engaged with the machine, a counterbalance for said cover, and a pair of blades carried by said cover adapted to connect each of said pairs of terminals when said cover is closed and to break such connections when said cover is raised.

In testimony whereof I have signed my name to this specification.

ARMIN LIPPMANN.

Copies of this patent may be obtained for five cents each, by addressing the "Commissioner of Patents, Washington, D. C."